United States Patent
Merritt et al.

(10) Patent No.: US 9,792,244 B2
(45) Date of Patent: Oct. 17, 2017

(54) MULTIPLE PROCESSOR ARCHITECTURE WITH FLEXIBLE EXTERNAL INPUT/OUTPUT INTERFACE

(71) Applicant: Honeywell International Inc., Morristown, NJ (US)

(72) Inventors: Ross Merritt, Ramsey, MN (US); Christopher Jay Matthews, Minneapolis, MN (US); Dang Tu Van-Cao, Champlin, MN (US); Christopher A. Lund, Otsego, MN (US); Timothy Merrill Buck, Oakdale, MN (US)

(73) Assignee: Honeywell International Inc., Morris Plains, NJ (US)

( * ) Notice: Subject to any disclaimer, the term of this patent is extended or adjusted under 35 U.S.C. 154(b) by 303 days.

(21) Appl. No.: 14/622,571

(22) Filed: Feb. 13, 2015

(65) Prior Publication Data

US 2016/0239455 A1 Aug. 18, 2016

(51) Int. Cl.
  *G06F 13/00* (2006.01)
  *G06F 13/42* (2006.01)
  *G06F 13/16* (2006.01)
  *G06F 13/30* (2006.01)

(52) U.S. Cl.
  CPC ...... *G06F 13/4226* (2013.01); *G06F 13/1663* (2013.01); *G06F 13/30* (2013.01)

(58) Field of Classification Search
  CPC .................. G06F 13/1663; G06F 13/4226
  See application file for complete search history.

(56) References Cited

U.S. PATENT DOCUMENTS

| | | | |
|---|---|---|---|
| 5,555,414 A | 9/1996 | Hough et al. |
| 5,894,560 A | 4/1999 | Carmichael et al. |
| 6,253,292 B1 | 6/2001 | Jhang et al. |
| 6,633,946 B1 | 10/2003 | Hendel |
| 6,806,730 B2 | 10/2004 | Bailis et al. |
| 7,024,510 B2 | 4/2006 | Olarig |
| 7,653,788 B2 | 1/2010 | Cousin et al. |
| 7,730,268 B2 | 6/2010 | Maheshwari et al. |
| 7,797,496 B2 | 9/2010 | Gruber et al. |

(Continued)

*Primary Examiner* — Zachary K Huson
(74) *Attorney, Agent, or Firm* — Fogg & Powers LLC (57) ABSTRACT

A multiple processor architecture with flexible external input/output interface is provided. In one embodiment, an open flexible processor architecture avionics device comprises: a multiple processor architecture having a primary processor, a secondary processor, a random access memory (RAM) coupled to at least the secondary processor, and a shared memory coupled to the primary and secondary processor; and a flexible input/output (I/O) interface coupled to the multiple processor architecture, wherein the flexible I/O interface provides I/O access to the primary processor using a fixed I/O protocol, and provides I/O access to the secondary processor using at least one re-configurable I/O protocol; wherein the primary processor is dedicated to executing embedded software for implementing a primary base functionality, the primary processor has read and write access to the shared memory, and the primary processor is not reprogrammable; and wherein the secondary processor has read-only access to the shared memory and is programmable.

20 Claims, 3 Drawing Sheets

(56) References Cited

U.S. PATENT DOCUMENTS

| | | | |
|---|---|---|---|
| 9,098,462 B1 * | 8/2015 | McNicholl | G06F 13/1631 |
| 2005/0076228 A1 | 4/2005 | Davis et al. | |
| 2008/0174472 A1 * | 7/2008 | Stone | G08G 5/0021 |
| | | | 342/30 |
| 2013/0275631 A1 | 10/2013 | Magro et al. | |

* cited by examiner

MULTIPLE PROCESSOR ARCHITECTURE WITH FLEXIBLE EXTERNAL INPUT/OUTPUT INTERFACE

BACKGROUND

For systems that operate while airborne, such as in aircraft, rocket launch vehicles, or similar systems, there is an ever-growing need to process data generated by on-board sensors. At the same time, for many airborne system applications, there are industry pressures to develop components for these systems to meet size weight and power specifications that are continually decreasing.

For the reasons stated above and for other reasons stated below, it will become apparent to those skilled in the art upon reading and understanding the specification, there is a need in the art for improved systems and methods for processing these sensor measurements within the MEMS-based IMU.

SUMMARY

In one embodiment, an open flexible processor architecture avionics device comprises a multiple processor architecture having at least a primary processor, at least a secondary processor, a random access memory (RAM) coupled to at least the secondary processor and a shared memory coupled to the primary processor and the secondary processor. The device further comprises a flexible input/output (I/O) interface coupled to the multiple processor architecture, wherein the flexible I/O interface provides I/O access to the primary processor using a fixed I/O protocol, and provides I/O access to the secondary processor using at least one re-configurable I/O protocol. The primary processor is dedicated to executing embedded software for implementing a primary base functionality, the primary processor has read and write access to the shared memory, and the primary processor is not reprogrammable. The secondary processor has read-only access to the shared memory and is programmable.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. These embodiments are described in sufficient detail to enable those skilled in the art to practice the invention, and it is to be understood that other embodiments may be utilized and that logical, mechanical, and electrical changes may be made. The following detailed description is, therefore, not to be taken in a limiting sense.

Embodiments of the present disclosure address the need to provide for additional on-board processing of sensor data by implementing an open and flexible processor architecture on avionics devices usually dedicated to performing a bounded well-defined function. That is, implementation of an open and flexible processor architecture as described herein permits the avionics device to reliably and securely perform a factory configured primary base function while providing a solution that permits field customized functions to be added to the device. For example, an Inertial Measurement Unit (IMU) is a common device used in avionic systems to sense linear accelerations and rotational rates. The output of inertial sensors within the IMU, which may include triads of accelerometers and gyroscopes, are processed by embedded IMU software to produce raw rotation rate and linear acceleration rate data along axes that correspond to the vehicle's reference frame. This raw inertial data may then be processed by another on-board avionics system, such as a navigation system, a vehicle control system, a guidance system, or the like. For example, the raw inertial data output from an IMU may be sent to a navigation system external to the IMU which uses the data to compute an attitude solution (i.e., the roll, pitch and/or yaw of the vehicle). As further discussed in detail below, with embodiments of the present disclosure, a vehicle manufacturer may instead choose to implement that navigation system, or at least a part thereof, within the IMU by utilizing the open flexible processor architecture described herein. This alleviates the need for providing separate electronics, power, wiring, etc. that would otherwise be required.

More specifically, the open flexible processor architecture described herein combines a multiple processor architecture (MPA) with a flexible input/output (I/O) interface. The MPA includes at least one processor (which may comprise a core of a multi-core processor) dedicated to executing the embedded software that implements the primary base function of the avionics device. The MPA further includes at least one other processor (which may comprise another core of a multi-core processor) that remains fully field programmable and configurable. Operation of the dedicated processor is isolated from the field programmable processor so that any programming or other faults affecting the field programmable processor cannot adversely affect the dedicated processor. Further, the embedded software that implements the primary base function of the avionics device is locked or otherwise not reconfigurable by end-users in the field. The flexible input/output (I/O) interface provides a means for field configuring the avionics device so that a customer may utilize the I/O protocols of their choice for interacting with the field programmable processor, while also implementing the pre-defined I/O protocol needed to interact with the dedicated processor.

Figure 1:
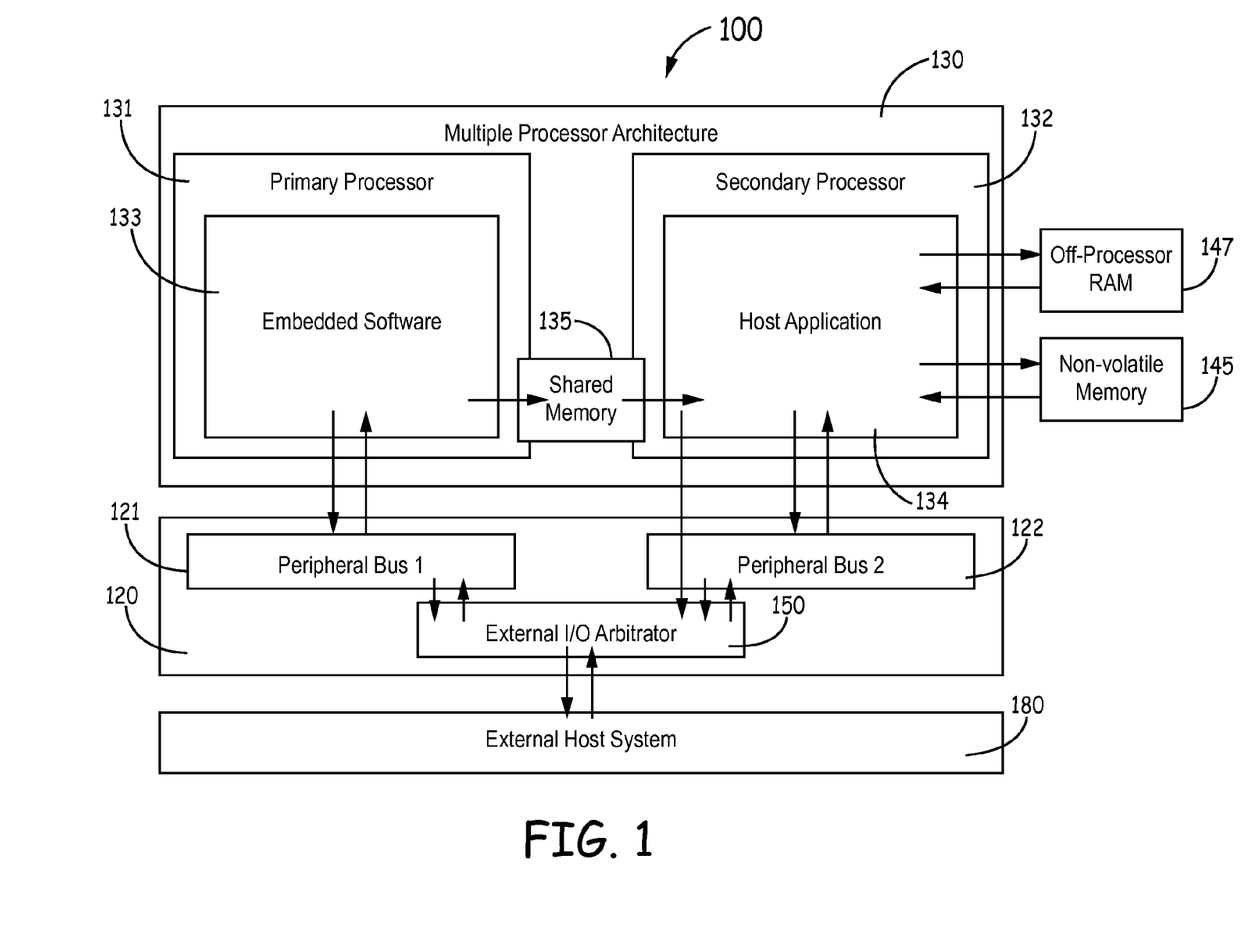
FIG. 1 is an exemplary embodiment of a multiple processor architecture (MPA) using standard interfaces including a flexible external I/O.

FIG. 1 shows an example of an avionics device 100 comprising an open flexible processor architecture that combines a multiple processor architecture (MPA) 130 with a flexible input/output (I/O) interface 120. In this implementation, MPA 130 is a dual processor architecture system. In other implementations, additional processors may be utilized. In the particular embodiment shown in FIG. 1, the avionics device 100 comprises an inertial measurement unit IMU. The MPA 130 interacts with the flexible input/output (I/O) interface 120, which in turn manages interaction with one or more external host systems 180. As the term is used herein, "host systems" refers to other systems and devices on avionics device 100 that may communicate with avionics device 100. In one implementation of this embodiment, processing system 130 is a Zynq processing system.

MPA 130 comprises at least two processing cores, including at least one primary processing core 131 and at least one secondary processing core 132. The embedded software 133 executed by primary processing core 131 is secure and cannot be altered in the field by an end user. In one embodiment where avionics device 100 implements an IMU, primary processing core 131 is dedicated to performing IMU processes by executing embedded IMU software. The IMU software may be responsible for performing functions such as inertial sensor sampling, and inertial sensor compensation. Primary processing core 131 may also be configured with built-in capabilities within to lockdown resources on MPA 130 such that the secondary processing core 132 may operate on device 100 without interfering with internal data and/or embedded software 133 utilized by primary processing core 131.

Secondary processing core 132 is an open processor which may be field programmed and configured by an end user. Secondary processing core 132 hosts software provided by the end user, and in some embodiments, controls the configuration of the flexible I/O interface 120. In one embodiment, the secondary processing core 132 may be coupled to a random access memory (RAM) 147 which is utilized by the second processing core 132 while executing software hosted by the secondary processing core 132. In the embodiment shown in FIG. 1, RAM 147 is shown implemented as an off-processor memory, though in other embodiments may be integrated with processing core 132. In some implementations, an off-processor RAM 147 may be coupled to both the primary processing core 131 and secondary processing core 132. RAM 147 may be implemented using any known method, such as but not limited to a double data rate type 3 dynamic RAM (DDR3 DRAM).

In some implementations, the secondary processing core 132 is also coupled with a non-volatile memory 145. One or both of read and write access with memory 145 may be implemented. For example, in one implementation, all or part of the software hosted by the secondary processing core can be loaded from the non-volatile memory 145. Similarly, secondary processing core 132 can retrieve data from non-volatile memory 145 and/or store data it generates on a non-volatile memory 145. In the example shown in FIG. 1, the secondary processing core may read data from the non-volatile memory 145 and the data is then stored on to or executed by the off-processor RAM 147. In one implementation of this embodiment, the non-volatile memory 145 is an electronically erasable programmable read-only memory (EEPROM). In another implementation of this embodiment, the non-volatile memory 145 is a flash memory. In some implementations, the primary processing core 131 may also be coupled with the non-volatile memory 145.

In some embodiments, primary processing core 131 may store or otherwise output data for use by the secondary processing core 132 through a shared memory component 135. Shared memory component 135 is comprised within MPA 130. Through shared memory component 135, part or all of the data available to the primary processing core 131 can be made for use by the secondary processing core 132. Although shared memory 135 may be read and write accessible to processing core 131, from the perspective of secondary processing core 132, it is read-only. That is, shared memory component 135 provides a one-way path from primary processing core 131 to secondary processing core 132, such that what primary processing core 131 writes into shared memory component 135, secondary processing core 132 can read from the shared memory component 135. However, secondary processing core 132 cannot communicate back with primary processing core 131 through the shared memory component 135. Thus, the data from primary processing core 131 is accessible via shared memory component 135 and used as necessary for processing by secondary processing core 132, while keeping primary processing core 131 secure from any interference by the user application.

The host system 180 interacts with MPA 130 via flexible input/output (I/O) interface 120. The end user can configure the I/O interface 120 to allow host system 180 to communicate with MPA 130 and use it for processing the host application 134 executed by secondary processing core 132. The I/O interface 120 includes at least one fixed I/O protocol and at least one reconfigurable protocol. The I/O interface 120 provides I/O access to the primary processing core 131 using a fixed I/O protocol 121. The I/O interface 120 provides I/O access to the secondary processing core 132 using at least one reconfigurable I/O protocol 122. I/O interface 120 is configured based on the signals provided by the secondary processing core 132.

In one implementation of this embodiment, I/O interface 120 comprises multiple peripheral devices. In the exemplary embodiment shown in FIG. 1, the I/O interface 120 comprises at least two peripheral buses, a first peripheral bus 121 coupled to the primary processing core 131 and a second peripheral bus 122 coupled to a secondary processing core 132. A two-way communication is provided between first peripheral bus 121 and the primary processing core 131, and two-way communication is provided between second peripheral bus 122 and secondary processing core 132. In some embodiments, there may be additional processors within MPA 130 that are coupled with a respective peripheral bus within I/O interface 120.

In one implementation of this embodiment, one or more of the peripheral buses comprise an Advanced Microcontroller Bus Architecture (AMBA) Advanced Peripheral Bus (APB) standard peripheral bus. The second peripheral bus 122 supports the I/O access to the secondary processing core 132 by using protocols such as a universal asynchronous receiver transmitter (UART) or a synchronous data link control (SDLC). In other implementations, second peripheral bus 122 may support other types of communication protocols.

In a further implementation of this embodiment, I/O interface 120 comprises an external I/O arbitrator 150 coupled to the first peripheral bus 121 and the second peripheral bus 122. External I/O arbitrator 150 also interacts with host system 180. External I/O arbitrator prevents host system 180 and MPA 130 from driving the peripheral buses 121 and 122 simultaneously. Signals provided by the secondary processor are communicated to the external I/O arbitrator 150 either directly or through the second peripheral bus 122. Based on those signals, external I/O arbitrator 150 is configured for processing host system 180. External I/O arbitrator 150 communicates the signals provided by host system 180 to the secondary processing core 132 via second peripheral bus 122.

Some of the pins included within the external I/O interface 120 are designed to have multiple configurations to input or output signals that the interface receives from the secondary processor and the host system. These pins are configured based on the signals communicated to the I/O interface 120 by the secondary processing core 132. Some pins of the external I/O interface may be fixed. In one implementation, the fixed pins are controlled by primary processing core 131 via first peripheral device 121. The configurable pins of external I/O arbitrator may be controlled by the secondary processing core 132 either directly or via second peripheral device 122.

In one implementation of this embodiment, the pins of the external I/O interface 120 can combine in various ways to form ports, each of the ports also having either single or multiple configurations. Ports formed on I/O interface 120 may support single-ended and/or differential signals. Ports comprised in I/O interface 120 may include universal asynchronous receiver transmitters (UARTs), which may be 4 Mbaud capable. In one implementation, the single ended signals are at a +5V logic level. In another implementation, the differential signals are RS485 compatible.

Figure 2:
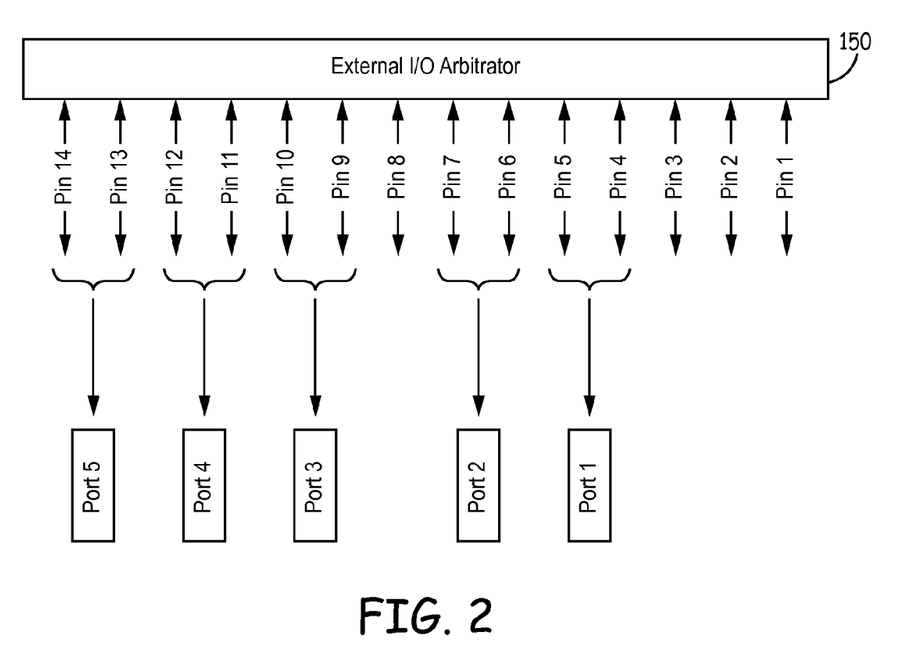
FIG. 2 is an exemplary embodiment of a flexible external I/O arbitrator included in the MPA of FIG. 1.

FIG. 2 is an exemplary embodiment of an external I/O interface comprised in MPA 130 of FIG. 1. The exemplary external I/O interface 120 described in FIG. 2 has 14 pins. In the example shown in FIG. 2, pin 1 and pin 2 are non-configurable. Pin 1 provides connection to ground and pin 2 connects to a voltage supply. In one implementation of this embodiment, the voltage supplied equals +5V. All or some of the pins 3 to 14 of the exemplary I/O interface shown in FIG. 2 may be configurable.

Pin 3 can be configured to output an IMU strobe signal or a discrete signal, or pin 3 can be configured to input a discrete signal, a time mark signal or a T20 global positioning systems receiver (GPSR) signal. In one implementation of this embodiment, pin 4 is configured as an output line where as pin 5 is configured as an input line. Pin 4 and pin 5 can combine to form port 1, which may have a single or multiple configurations. In the example shown in FIG. 2, port 1 has a single configuration. In one such implementation, port 1 is configured to send and receive single ended full duplex asynchronous communication signals.

In the exemplary embodiment of FIG. 2, pins 6 and 7 have multiple configurations. Pin 6 supports single ended signals and can be configured as an IMU strobe output line, a discrete output line, reset input line, or half duplex asynchronous communication (transmit line). Pin 7 can be configured as a single ended download mode select input line. In one implementation of this embodiment, pin 6 and pin 7 combine to form port 2. Port 2 supports single ended signals and can be configured as a full duplex asynchronous communication line, a discrete input line, or data enable input line. Pin 8 can be configured as a time mark output line, an inertial measurement unit command input line, port 1 baud select input line, single ended IMU strobe output line, discrete input or output line, or configuration select line: flight or test.

Pins 9 and 10, of the example shown in FIG. 2, have multiple configurations. Pin 9 supports single ended signals. Pin 9 can be further configured as a transmit line for half duplex asynchronous communication, or set to output discrete or IMU strobe signals. Pin 10 supports single ended signals and can be configured as a receiver line for time mark, discrete, or half duplex asynchronous communication signals. Alternatively, pin 10 can be set as a configuration select between flight or test. In one implementation of this embodiment, pins 9 and 10 can combined to form port 3. Port 3 can support both single ended and differential signals. Port 3 can be configured as a differential synchronous data link control (SDLC) half duplex input/output line, single ended full duplex asynchronous communication line, differential discrete input or output line, differential half duplex asynchronous communication (transmit line or receiver line), or single ended SDLC data input or output line.

In some implementations, pins 11 and pin 12 can have multiple configurations. In the example shown in FIG. 2, pins 11 and 12 can send and receive signals and combine to form port 4. Port 4 supports both single ended and differential signals. Port 4 can be configured as a single ended full duplex asynchronous communication line, differential time mark input or output line, differential or single ended discrete input or output line, differential half duplex asynchronous communication (transmit or receiver line), single ended gated clock synchronous output line, differential IMU external synchronous input line, or differential general purpose clock or IMU sensor sample pulse output line.

In the exemplary embodiment of FIG. 2, pins 13 and 14 can send and receive signals. Pin 13 can be set to output single ended discrete signals and pin 14 can be set to input single ended discrete signals. In one implementation, pins 13 and 14 combine to form port 5. Port 5 can have multiple configurations and supports both single ended and differential signals. Port 5 can be configured as single ended full duplex asynchronous communication line, single ended SDLC data input or output line, single ended half duplex asynchronous communication line, differential SDLC clock input or output line, differential discrete input or output line, differential time mark input or output line, differential half duplex asynchronous communication (transmit or receiver line), or differential gated clock shift or clock output line.

Figure 3:
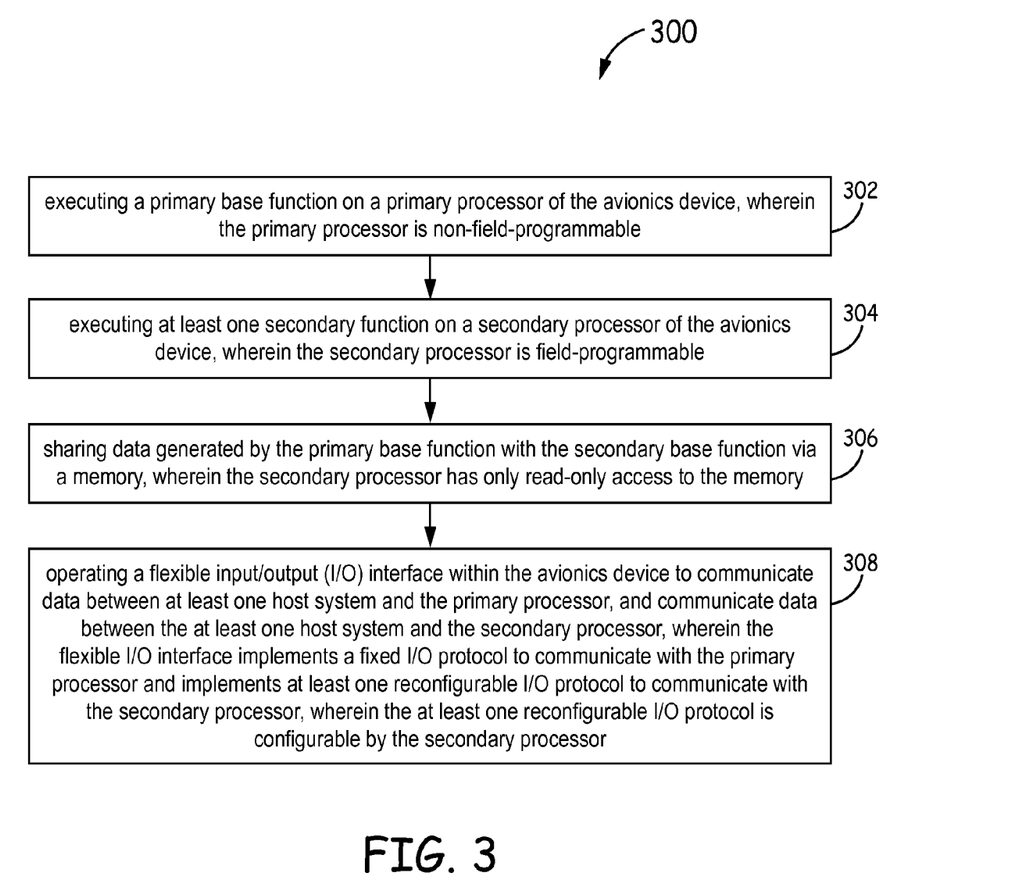
FIG. 3 describes a method of hosting software using a MPA system, such as the MPA system of FIG. 1.

FIG. 3 is a flow chart illustrating a method for an open flexible processor architecture avionics device of one embodiment of the present disclosure. For some embodiments, the method of FIG. 3 may be implemented using any embodiment of the open flexible processor architecture avionics device or elements thereof described above.

The method starts at 302 with executing a primary base function on a primary processor of the avionics device, wherein the primary processor is non-field-programmable. The primary processor can be secured such that is it not altered in the field by an end user. In some implementations of this method, the primary processor is dedicated to performing IMU processes and executing a primary base function comprises executing embedded IMU software.

The method proceeds to 304 with executing at least one secondary function on a secondary processor of the avionics device, wherein the secondary processor is field-programmable. That is, while the primary processor is dedicate to performing its primary base function, the secondary processor remains available to perform other functions at the discretion of the end customer. Other avionics functions may be programmed into the secondary processors that are completely independent from the primary base function. Alternately, the secondary functions may be complementary to the primary base function, for example, by using data generated by the primary base function. As mentioned above, the primary processor and the secondary processor may be implemented using separate processing devices, or through separate cores of a multiple core processing device.

Accordingly, the method proceeds to 306 with sharing data generated by the primary base function with the secondary base function via a memory, wherein the secondary processor has only read-only access to the memory. While the secondary function performed by the secondary processor may utilize data generated by the primary processor, one-way isolation between the two processors is maintained to prevent activities of the secondary processor from in any way corrupting data utilized by the primary processor. As such, raw data and calculation results saved into the memory by the primary processor are accessible by the secondary processor, but only on a read-only basis.

The method proceeds to 308 with operating a flexible input/output (I/O) interface within the avionics device to communicate data between at least one host system and the primary processor, and communicate data between the at least one host system and the secondary processor, wherein the flexible I/O interface implements a fixed I/O protocol to communicate with the primary processor and implements at least one reconfigurable I/O protocol to communicate with the secondary processor, wherein the at least one reconfigurable I/O protocol is configurable by the secondary processor.

In one implementation of this method, the I/O interface comprises a first peripheral bus coupled to the primary processor and a second peripheral bus coupled to a secondary processor, and the method further comprises arbitrating access to the first peripheral bus and the second peripheral bus to prevent the at least one host system from simultaneously accessing the first peripheral bus and the second peripheral bus. Operating a flexible I/O interface can further comprise providing a universal asynchronous receiver transmitter (UART) protocol or a synchronous data link control (SDLC) protocol for the second peripheral bus to access the secondary processor.

I/O interface further comprises configurable pins that can be set based on the signals provided by the secondary processor. The pins included in the I/O interface can support one or both of single ended or differential signals. In some implementations of this method, operating a flexible I/O interface can comprise providing means to combine two or more of the pins to form ports that support one or both of single ended signals and differential signals.

Example Embodiments

Example 1 includes an open flexible processor architecture avionics device, the device comprising: a multiple processor architecture having at least a primary processor, at least a secondary processor, a random access memory (RAM) coupled to at least the secondary processor, and a shared memory coupled to the primary processor and the secondary processor; and a flexible input/output (I/O) interface coupled to the multiple processor architecture, wherein the flexible I/O interface provides I/O access to the primary processor using a fixed I/O protocol, and provides I/O access to the secondary processor using at least one re-configurable I/O protocol; wherein the primary processor is dedicated to executing embedded software for implementing a primary base functionality, the primary processor has read and write access to the shared memory, and the primary processor is not reprogrammable; and wherein the secondary processor has read-only access to the shared memory and is programmable.

Example 2 includes the device of Example 1, wherein the flexible I/O interface further comprises: a first peripheral bus coupled to the primary processor; a second peripheral bus coupled to the secondary processor; and an external I/O arbitrator coupled to the first peripheral bus and the second peripheral bus; wherein the external I/O arbitrator prevents an external host system and the primary processor or the secondary processor to drive the respective first or second peripheral buses simultaneously.

Example 3 includes the device of Example 2, wherein one or both of the first peripheral bus and the second peripheral bus comprise an AMBA Advanced Peripheral Bus (APB) standard peripheral bus.

Example 4 includes the device of Example 2 or 3, wherein one or both of the second peripheral bus and the external I/O arbitrator are configured based on signals from the secondary processor.

Example 5 includes the device of any of Examples 2-4, wherein the second peripheral bus supports I/O access to the secondary processor using at least one of a universal asynchronous receiver transmitter (UART) protocol or an synchronous data link control (SDLC) protocol.

Example 6 includes the device of any of Examples 1-5, the device further comprising at least one set of inertial sensors coupled to the primary processor, wherein the embedded software for implementing a primary base functionality comprises Inertial Measurement Unit software.

Example 7 includes the device of Example 6, wherein the IMU software saves raw inertial data to the shared memory.

Example 8 includes the device of Example 7, wherein an application executed by the secondary processor accesses the raw inertial data from the shared memory and sends it to an external host system to be processed.

Example 9 includes the device of any of Examples 1-8, wherein the secondary processor executes an application to interact with a navigation system, a vehicle control system, or a guidance system.

Example 10 includes the device of any of Example 1-9, further comprising a non-volatile memory that interacts with the secondary processor and stores data generated by the secondary processor.

Example 11 includes the device of Example 10, wherein the non-volatile memory is an electronically erasable programmable read-only memory or a flash memory.

Example 12 includes the device of any of Examples 2-11, wherein the flexible external I/O has fourteen pins of which at least two pins are non-configurable.

Example 13 includes the device of any of Examples 2-12, wherein two or more pins of the flexible external I/O combine to form one or more ports that support single-ended signals.

Example 14 includes the device of any of Examples 2-13, wherein two or more pins of the flexible external I/O combine to form one or more ports that support differential signals.

Example 15 includes a method for an open flexible processor architecture avionics device, the method comprising: executing a primary base function on a primary processor of the avionics device, wherein the primary processor is non-field-programmable; executing at least one secondary function on a secondary processor of the avionics device, where the secondary processor is field-programmable; sharing data generated by the primary base function with the secondary base function via a memory, wherein the secondary processor has only read-only access to the memory; and operating a flexible input/output (I/O) interface within the avionics device to communicate data between at least one host system and the primary processor, and communicate data between the at least one host system and the secondary processor, wherein the flexible I/O interface implements a fixed I/O protocol to communicate with the primary processor and implements at least one reconfigurable I/O protocol to communicate with the secondary processor, wherein the at least one reconfigurable I/O protocol is configurable by the secondary processor.

Example 16 includes the method of Example 15, wherein the flexible input/output (I/O) interface comprises a first peripheral bus coupled to the primary processor and a second peripheral bus coupled to the secondary processor, the method further comprising: arbitrating access to the first peripheral bus and the second peripheral bus to prevent the at least one host system from simultaneously accessing the first peripheral bus and the second peripheral bus.

Example 17 includes the method of Example 15 or 16, wherein operating the flexible I/O interface further comprises providing a universal asynchronous receiver transmitter (UART) protocol or a synchronous data link control (SDLC) protocol for the second peripheral bus to access the secondary processor.

Example 18 includes the method of any of Examples 15-17, wherein operating the flexible I/O interface further comprises providing means to combine two or more of the pins to form ports that support one or both of single ended signals and differential signals.

Example 19 includes an inertial measurement unit, the unit comprising: a multiple processor architecture having a primary processing core dedicated to executing embedded IMU software, a secondary processing core that is programmable by an end user and a shared memory component, wherein the primary processing core has read and write access to the shared memory component and the secondary processing core has read-only access to the shared memory component; a flexible input/output (I/O) interface having a first advance peripheral bus (APB), a second advance peripheral bus (APB) and a flexible external input/output (I/O) arbitrator, wherein the first APB interacts with the primary processing core, the second APB interacts with the secondary processing core, and the first APB and the second APB both interact with the external I/O arbitrator.

Example 20 includes the inertial measurement unit of Example 19, wherein the flexible external I/O comprises pins and ports that communicate single ended signals at a +5V level.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An open flexible processor architecture avionics device, the device comprising:
   a multiple processor architecture having at least a primary processor, at least a secondary processor, a random access memory (RAM) coupled to at least the secondary processor, and a shared memory coupled to the primary processor and the secondary processor; and
   a flexible input/output (I/O) interface coupled to the multiple processor architecture, wherein the flexible I/O interface provides I/O access to the primary processor using a fixed I/O protocol, and provides I/O access to the secondary processor using at least one re-configurable I/O protocol;
   wherein the primary processor is dedicated to executing embedded software for implementing a primary base functionality, the primary processor has read and write access to the shared memory, and the primary processor is not reprogrammable; and
   wherein the secondary processor has read-only access to the shared memory and is programmable.

2. The device of claim 1, wherein the flexible I/O interface further comprises:
   a first peripheral bus coupled to the primary processor;
   a second peripheral bus coupled to the secondary processor; and
   an external I/O arbitrator coupled to the first peripheral bus and the second peripheral bus;
   wherein the external I/O arbitrator prevents an external host system and the primary processor or the secondary processor to drive the respective first or second peripheral buses simultaneously.

3. The device of claim 2, wherein one or both of the first peripheral bus and the second peripheral bus comprise an AMBA Advanced Peripheral Bus (APB) standard peripheral bus.

4. The device of claim 2, wherein one or both of the second peripheral bus and the external I/O arbitrator are configured based on signals from the secondary processor.

5. The device of claim 2, wherein the second peripheral bus supports I/O access to the secondary processor using at least one of a universal asynchronous receiver transmitter (UART) protocol or an synchronous data link control (SDLC) protocol.

6. The device of claim 1, the device further comprising at least one set of inertial sensors coupled to the primary processor, wherein the embedded software for implementing a primary base functionality comprises Inertial Measurement Unit software.

7. The device of claim 6, wherein the IMU software saves raw inertial data to the shared memory.

8. The device of claim 7, wherein an application executed by the secondary processor accesses the raw inertial data from the shared memory and sends it to an external host system to be processed.

9. The device of claim 1, wherein the secondary processor executes an application to interact with a navigation system, a vehicle control system, or a guidance system.

10. The device of claim 1, further comprising a non-volatile memory that interacts with the secondary processor and stores data generated by the secondary processor.

11. The device of claim 10, wherein the non-volatile memory is an electronically erasable programmable read-only memory or a flash memory.

12. The device of claim 2, wherein the flexible external I/O has fourteen pins of which at least two pins are non-configurable.

13. The device of claim 2, wherein two or more pins of the flexible external I/O combine to form one or more ports that support single-ended signals.

14. The device of claim 2, wherein two or more pins of the flexible external I/O combine to form one or more ports that support differential signals.

15. A method for an open flexible processor architecture avionics device, the method comprising:
   executing a primary base function on a primary processor of the avionics device, wherein the primary processor is non-field-programmable;
   executing at least one secondary function on a secondary processor of the avionics device, where the secondary processor is field-programmable;
   sharing data generated by the primary base function with the secondary base function via a memory, wherein the secondary processor has only read-only access to the memory; and
   operating a flexible input/output (I/O) interface within the avionics device to communicate data between at least one host system and the primary processor, and communicate data between the at least one host system and the secondary processor, wherein the flexible I/O interface implements a fixed I/O protocol to communicate with the primary processor and implements at least one reconfigurable I/O protocol to communicate with the secondary processor, wherein the at least one reconfigurable I/O protocol is configurable by the secondary processor.

16. The method of claim 15, wherein the flexible input/output (I/O) interface comprises a first peripheral bus coupled to the primary processor and a second peripheral bus coupled to the secondary processor, the method further comprising:
   arbitrating access to the first peripheral bus and the second peripheral bus to prevent the at least one host system from simultaneously accessing the first peripheral bus and the second peripheral bus.

17. The method of claim 15, wherein operating the flexible I/O interface further comprises providing a universal asynchronous receiver transmitter (UART) protocol or a synchronous data link control (SDLC) protocol for the second peripheral bus to access the secondary processor.

18. The method of claim 15, wherein operating the flexible I/O interface further comprises providing means to combine two or more of the pins to form ports that support one or both of single ended signals and differential signals.

19. An inertial measurement unit, the unit comprising:
a multiple processor architecture having a primary processing core dedicated to executing embedded IMU software, a secondary processing core that is programmable by an end user and a shared memory component, wherein the primary processing core is not reprogrammable, and wherein the primary processing core has read and write access to the shared memory component and the secondary processing core has read-only access to the shared memory component;
a flexible input/output (I/O) interface having a first advance peripheral bus (APB), a second advance peripheral bus (APB) and a flexible external input/output (I/O) arbitrator, wherein the first APB interacts with the primary processing core using a fixed I/O protocol, the second APB interacts with the secondary processing core using a re-configurable I/O protocol, and the first APB and the second APB both interact with the external I/O arbitrator.

20. The inertial measurement unit of claim 19, wherein the flexible external I/O comprises pins and ports that communicate single ended signals at a +5V level.

\* \* \* \* \*